Dec. 13, 1960  M. E. ROUAUX  2,964,309
FURNACE APPARATUS FOR THE REDUCTION OF METALLIC ORES
Filed Dec. 19, 1956  2 Sheets-Sheet 1
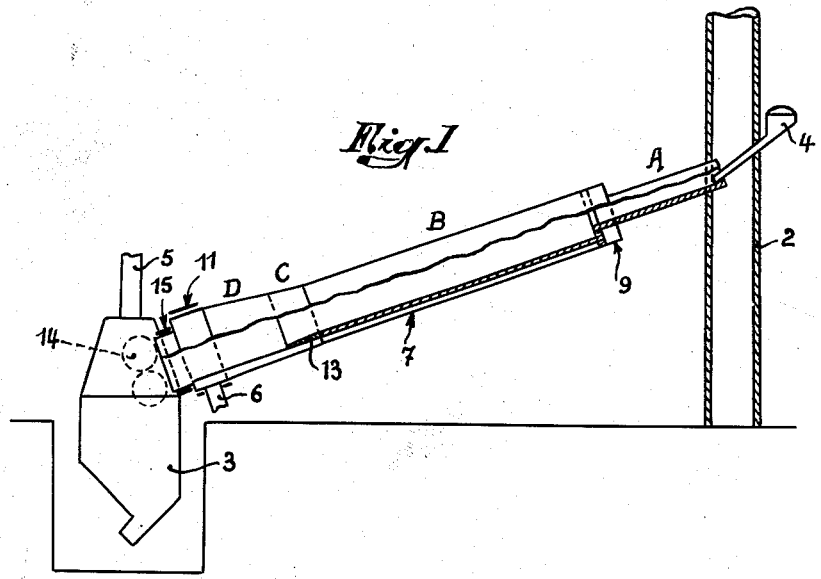
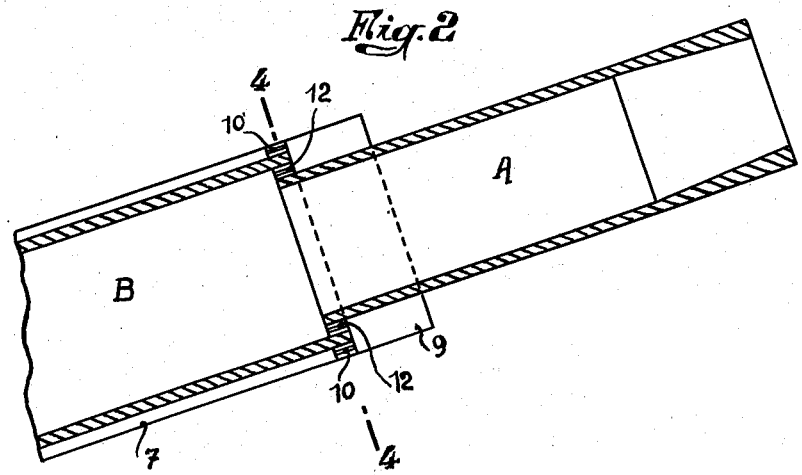

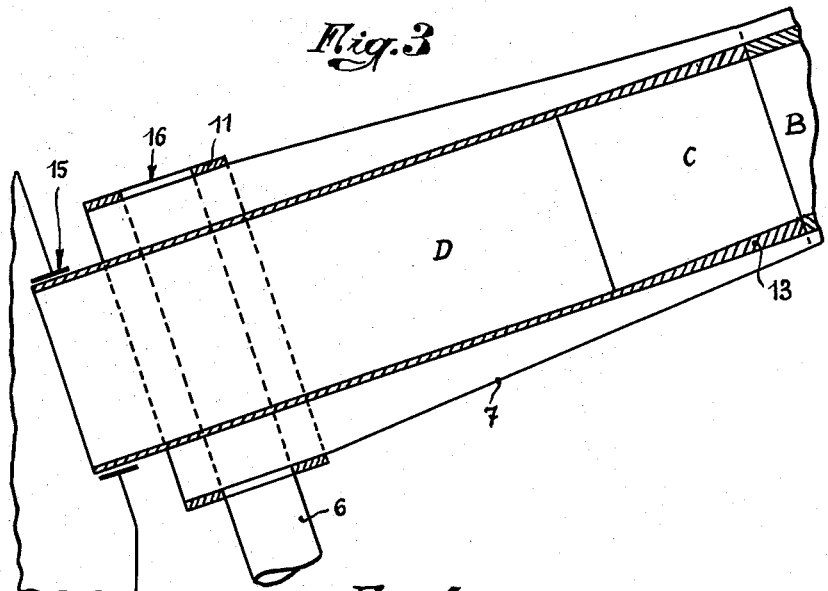
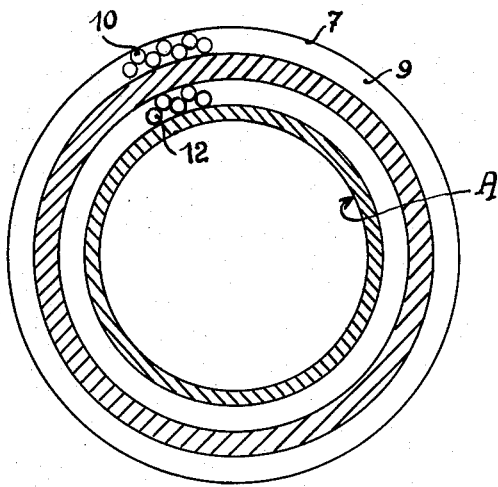

United States Patent Office 2,964,309
Patented Dec. 13, 1960

2,964,309

FURNACE APPARATUS FOR THE REDUCTION OF METALLIC ORES

Marcel Eugène Rouaux, 122 Rue Robespierre, Saint-Etienne, France

Filed Dec. 19, 1956, Ser. No. 629,264

5 Claims. (Cl. 266—24)

This invention relates to furnace apparatus for the reduction of metallic ores.

Metallurgists are nowadays directing attention to the reduction of metallic ores of various kinds in apparatus other than the various shaft furnaces at present in use.

Indeed, besides the obvious desirability of effecting economies in the fuel required for the reduction process itself, it is necessary to plan for the time, which may not be far distant, when metallurgical coke will no longer be available, or will become so expensive as to render its use prohibitive.

It is known to gasify a very wide range of fuels or hydrocarbon products which are available in considerable reserves in the ground. It is also known, for example, that hydrogen can be produced cheaply by decomposition of water when electric current is very cheap. It is also known that the action of reducing gases introduces the minimum amount of impurities into the metals obtained, whilst requiring only as much energy as is required for the reduction operation.

An object of the present invention is to devise furnace apparatus for the reduction of various metallic ores by reducing gases of various kinds, and in principle producing by this method a light and divided metallic sponge.

In accordance with the invention there is provided for use in apparatus for the reduction of metallic ores, a rotatable furnace adapted to be located in an inclined position so that the furnace can be operated in a full or substantially full condition, said furnace having at its end, which will be located uppermost, a portion which can be arranged so as to open directly into a chimney and through which upper portion the furnace can be charged with metallic ore, said furnace having also a sleeve extending from the opposite or lower end of the furnace over approximately three-quarters of the length of the furnace, means for producing through said sleeve an ascending current of air admitted at or adjacent the lower end of the sleeve, means for causing air to flow from the sleeve into the inside of the furnace in the vicinity of the upper portion of the furnace and thereafter to flow in a downward direction so as, during operation of the furnace, to pass along the inner wall of the furnace in counter-current to residual reducing gases and volatile products of reduction which, during operation, flow in an upward direction and tend to wash or flow along the wall of the furnace, thereby to bring about ignition of the combustible gases in an appropriately located region in the furnace for the heating of metallic ore fed thereto.

The furnace, when installed for operation, is situated in an inclined position for operation in a full condition. It is charged at the top end with metallic ore, and at its bottom end with reducing gases injected under adjustable pressure and through the heat-insulated sleeve circulates a current of air admitted at the bottom and issuing at the top into an annular chamber for supplying the furnace with combustion-assisting substance. These reducing gases are constituted by mixtures of carbon monoxide and hydrogen as supplied by any conventional source whatever, such as an auxiliary gasifying plant, or again I may use a reducing gas of any origin whatever, preferably with very large contents of hydrogen. The air enters the upper part of the furnace, and travels downwards in the form of a cylindrical flow of air. Its speed is so regulated that it is capable of enclosing and displacing the residual reducing gases and volatile reduction products to an appropriate level where a blazing fire is established whose position is stable. The blazing fire is to allow the ores to be heated and roasted adequately in approximately the upper quarter of the brick-lined furnace. The two middle quarters delimit the reduction zone. The wall of the furnace is protected by refractory bricks of appropriate quality and composition. The lower quarter of the furnace comprises a refractory wall which dissipates heat effectively.

For a better understanding of the invention and to show how it may be carried into effect, the same will now be described, by way of example, with reference to the accompanying diagrammatic drawings, in which:

Fig. 1 is an elevational view of part of apparatus comprising a furnace according to the invention, Figs. 2 and 3 are enlarged detail views comprising longitudinal sectional views illustrating respectively, the upper part and the lower part of the furnace, and Fig. 4 is a cross-sectional view taken along the line 4—4 of Fig. 2.

The furnace which is rotatable is installed, as is shown in Fig. 1, between a chimney 2 into which issue the gases coming from the reduction and roasting of the ore, and a lock chamber 3, fluid-tightness between the rotating furnace and the lock chamber being ensured at 15 by an unctuous substance. The furnace is situated in an inclined position, approximately 15° with respect to the horizontal, in such a manner as to operate full, and is driven in rotational movement about its axis by an appropriate device which is not illustrated in the drawings. The furnace is charged with ore at its upper portion, that is to say at 4, and is fed with reducing gases through a conduit 5 entering the lock chamber 3. The lower portion of the furnace opens into the interior of the lock chamber 3. It should be remarked that the furnace is shown in Fig. 1 partly elevationally and partly cross-sectionally with a wavy longitudinal line separating the part seen in elevation from the part seen cross-sectionally.

The furnace is divided into four zones which, from the upper end of the furnace to its lower end, are as follows:

A zone A wherein the ore is heated and roasted, this zone extending over the upper quarter of the furnace;

A zone B for the reduction of the metallic oxides, that is to say, for the production of metallic sponge, this zone extending over the two middle quarters of the furnace;

Two successive cooling zones C and D which are washed strongly externally by air circulating in an air sleeve 7, these two zones C and D extending over the lower quarter of the furnace.

In the three lower quarters of the furnace, that is to say, at the level of the cooling and reduction zones, the furnace is jacketed in the air sleeve 7. At its lower end, the air sleeve is connected to an air inlet conduit 6. In addition the said sleeve is surrounded at the level of the conduit 6, with an easy fit, by a wide metal collar 16, and fluid-tightness in the region 11 between the collar 16 and the air sleeve 7 is ensured by an unctuous substance such as, for example, a grease of the "Belleville" type.

At its upper portion, the air sleeve 7 opens into an air box or annular chamber 9 coaxial with the furnace, through a ring 10 made of steel or any other suitable material and formed with ducts of appropriate cross-section. The air chamber 9 itself opens through an inner ring of ducts 12 into the zone B of the furnace. As shown in Fig. 2, zone A of the furnace with which the chamber 9 is concentric, is of smaller diameter than zone B.

It will be apparent that the annular chamber 9 must comprise the provision of ducts and valves so as to avoid the risks of explosion which might arise from inopportune mixtures of combustible gases and air.

The air which is admitted at the lower end of the air sleeve 7, is supplied by a blower of the centrifugal type.

The arrangement is, therefore, such that the heating of the ore to be treated and the consumption of the heat of the gases produced by the combustion, proceed in countercurrent. The same applies to the reducing gases and the iron sponge. Furthermore, heat losses are for the most part eliminated owing to the air sleeve.

In order to prevent the furnace, which always operates full, from discharging at its lower end a cylinder of metallic sponge it is necessary to arrange at the end of the reduction zone an annular sector in which a very rapid cooling of the sponge is effected.

The wall of the said furnace is therefore made of refractory and insulating bricks at its zone A and B and of refractory products which are not heat-insulating, for example sheet steel, in its zones C and D. Moreover, in zone C where a rapid cooling of the metallic sponge is to be effected, the furnace comprises a refractory ring (not heat-insulating as has just been stated) 13 whose properties are such as to cool the sponge cylinder rapidly and thus cause the latter to divide into successive layers.

The sponge divides up into successive layers which finally become cooled in the lower portion of the furnace and are broken up, upon issuing therefrom, by a grinder device 14 situated inside the lock chamber 3 into which the conduit 5 supplying the reducing gases opens.

For the efficient operation of the furnace, it is necessary that the current of air introduced into the furnace should circulate parallel to the generatrices of the furnace at a velocity which is inverse to and slightly greater than that of the residual reducing gases, and volatile products of the reduction operation which tend to flow or wash along the walls of the furnace. Thus the combustible gases which are enclosed are driven to a sufficient distance and the phenomenon of the blaze is correctly established.

The reduction temperatures depend on the nature of the ores treated. Thus, in the particular case of "red muds," a residual product from treatment of bauxites by the Bayer process, the reaction zone is kept at a temperature ranging between 1,050 and 1,300° C., depending on the composition of the said muds and the reaction speeds which it is desired to obtain.

As has been stated hereinbefore, the residual reducing gases and the volatile products of reduction impinge at the top of zone B on the current of heated air which comes from the chamber 9 and moves downwards at a speed slightly greater than that of the combustible gases. Ignition of the gaseous mixture takes place and consequently heating and roasting of the ore in zone A. In zone B the reduction of the roasted oxides and the production proper of the metallic sponge take place. The frusto-conical ring 13 in zone C brings about, at the bottom of zone B, a very rapid cooling of the sponge and consequently causes it to be divided up into layers. These layers of sponge finally become cooled in zone D and fall into the lock chamber 3 which contains the grinding device 14.

As for the gases given off at the top of the furnace, they are collected directly into a chimney so as to avoid the disadvantages caused by condensation. Any kind of appropriate filters can be mounted in the chimney, which can be widened if necessary.

The output of this furnace depends essentially on the three following factors (all other things being equal):

The temperature maintained in the reduction zone B;
The rate of flow and composition of the reducing gases; and
The rate of flow of the air.

As will be apparent, the invention is not limited to the particular embodiment of rotating furnace which has been indicated hereinbefore by way of example; on the contrary it covers all modified forms of embodiments.

I claim:

1. A rotary furnace for the reduction of metal ore through hydrogen-containing gases, comprising a sloping rotary furnace, a cylindrical jacket extending throughout the length and periphery of said rotary furnace and the ends of which register substantially with the ends of said rotary furnace, a roasting chamber forming an extension for the furnace body at its upper end the length of which is equal to about one third of the length of the furnace body, a chimney into which said extension opens, means for feeding ore into the upper end of the extension, means for feeding continuously a large body of cold air into the lower end of the jacket to constrain said air to move upwardly in a direction opposed to the downward movement of the ore through gravity, means for feeding the reducing gases into the lower end of the furnace body, a lining of refractory heat-insulating bricks extending over the two upper thirds of the furnace body, a lining of heat transmitting refractory material for the lower third of the furnace body, and means for constraining the air arriving at the upper end of the jacket to flow back directly into the upper end of the furnace body to burn the residuary gases formed through the reduction of the ore by the reducing gases in the furnace body.

2. A rotary furnace for the reduction of metal ore through hydrogen-containing gases, comprising a sloping rotary furnace, a cylindrical jacket extending throughout the length and periphery of said rotary furnace and the ends of which register substantially with the ends of said rotary furnace, a roasting chamber forming an extension for the furnace body at its upper end the length of which is equal to about one third of the length of the furnace body, a chimney into which said extension opens, means for feeding ore into the upper end of the extension, means for feeding continuously a large body of cold air into the lower end of the jacket to constrain said air to move upwardly in a direction opposed to the downward movement of the ore under gravity, means for feeding the reducing gases into the lower end of the furnace body, a lining of refractory heat-insulating bricks extending over the two upper thirds of the furnace body, a lining of heat-transmitting refractory material for the lower third of the furnace body to allow cooling energetically the metallic sponge formed in the furnace body and dropping into the lower end of the latter, and means for constraining the air arriving at the upper end of the jacket to flow back directly into the upper end of the furnace body to burn the residuary gases formed through the reduction of the ore by the reducing gases in the furnace body.

3. A rotary furnace for the reduction of metal ore through hydrogen-containing gases, comprising a sloping rotary furnace, a cylindrical jacket extending throughout the length and periphery of said rotary furnace and the ends of which register substantially with the ends of said rotary furnace, a roasting chamber forming an extension for the furnace body at its upper end the length of which is equal to about one third of the length of the furnace body, a chimney into which said extension opens, means for feeding ore into the upper end of the extension, means for feeding continuously a large body of cold air into the lower end of the jacket to constrain said air to move upwardly in a direction opposed to the downward movement of the ore through gravity, means for feeding the reducing gases into the lower end of the furnace body, a lining of refractory heat-insulating bricks extending over the two upper thirds of the furnace body, a lining of heat transmitting refractory material for the lower third of the furnace body to allow cooling energetically the metallic sponge formed in the furnace body and dropping into the lower end of the latter, means for constraining the air arriving at the upper end of the jacket to flow back directly into the upper end of the furnace body to burn the residuary gases formed through the reduction of the ore by the reducing gases in the furnace body, a lock chamber at the lower end of said furnace body and registering with the means feeding the reducing gases and a crusher inside said lock chamber for the sponge metal formed in the furnace body and dropping out of the latter.

4. A rotary furnace for the reduction of metal ore through hydrogen-containing gases, comprising a sloping rotary furnace body, a cylindrical jacket extending throughout the length and periphery of said rotary furnace and the ends of which register substantially with the ends of said rotary furnace, a roasting chamber forming an extension for the furnace body at its upper end the length of which is equal to about one third of the length of the furnace body, a chimney into which said extension opens, means for feeding ore into the upper end of the extension, means for feeding the reducing gases into the lower end of the furnace body, means for feeding continuously a large body of cold air into the lower end of the jacket to constrain said air to move upwardly in a direction opposed to the downward movement of the ore through gravity at a speed slightly higher than the upwardly directed speed of the reducing gases inside the furnace body, a lining of refractory heat-insulating bricks extending over the two upper thirds of the furnace body, a lining of heat transmitting refractory material for the lower third of the furnace body, and means for constraining the air arriving at the upper end of the jacket to flow back directly into the upper end of the furnace body to burn the residuary gases formed through the reduction of the ore by the reducing gases in the furnace body.

5. A rotary furnace for the reduction of metal ore through hydrogen-containing gases, comprising a sloping rotary furnace body, a cylindrical jacket extending throughout the length and periphery of said rotary furnace and the ends of which register substantially with the ends of said rotary furnace, a roasting chamber forming an extension for the furnace body at its upper end the length of which is equal to about one third of the length of the furnace body, a chimney into which said extension opens, means for feeding ore into the upper end of the extension, means for feeding continuously a large body of cold air into the lower end of the jacket to constrain said air to move upwardly in a direction opposed to the downward movement of the ore under gravity, means for feeding the reducing gases into the lower end of the furnace body, an annular chamber surrounding the extension at the upper end of the furnace body in adjacent relationship with the latter, a lining of refractory heat-insulating bricks extending along the upper two-thirds of the furnace body, a lining of heat-transmitting refractory material for the lower third of the furnace body, and pipes of refractory material arranged in two coaxial annular formations connecting said annular chamber with the jacket and with the furnace body respectively to constrain the air arriving at the upper end of the jacket to flow back directly into the upper end of the furnace body to burn the residuary gases formed through the reduction of the ore by the reducing gases in the furnace body.

References Cited in the file of this patent

UNITED STATES PATENTS

| | | |
|---|---|---|
| 236,648 | Thompson | Jan. 11, 1881 |
| 1,311,645 | Foss | July 29, 1919 |
| 1,401,445 | Rodgers | Dec. 27, 1921 |
| 2,292,579 | Moore | Aug. 11, 1942 |
| 2,375,487 | Newhouse | May 8, 1945 |
| 2,430,171 | Hatch | Nov. 4, 1947 |
| 2,500,553 | Lykken | Mar. 14, 1950 |
| 2,754,105 | Pistorius et al. | July 10, 1956 |